(12) United States Patent
Strzalkowski

(10) Patent No.: US 8,908,390 B2
(45) Date of Patent: *Dec. 9, 2014

(54) SWITCHING CONVERTER SYSTEMS WITH ISOLATING DIGITAL FEEDBACK LOOPS

(71) Applicant: Analog Devices, Inc., Norwood, MA (US)

(72) Inventor: Bernhard Strzalkowski, Munich (DE)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,108

(22) Filed: May 24, 2013

(65) Prior Publication Data

US 2013/0272035 A1   Oct. 17, 2013

Related U.S. Application Data

(63) Continuation of application No. 12/752,930, filed on Apr. 1, 2010, now Pat. No. 8,451,628.

(51) Int. Cl.
*H02M 3/335* (2006.01)

(52) U.S. Cl.
CPC ...... *H02M 3/33515* (2013.01); *H02M 3/33523* (2013.01); *H02M 3/33546* (2013.01)
USPC .......................................... 363/21.01; 363/97

(58) Field of Classification Search
USPC .............. 363/20, 21.01, 21.12, 21.13, 95, 97, 363/131
See application file for complete search history.

(56) References Cited

U.S. PATENT DOCUMENTS

| | | | | |
|---|---|---|---|---|
| 5,530,636 | A | * | 6/1996 | Brown .......................... 363/97 |
| 5,559,683 | A | * | 9/1996 | Schoenwald ............... 363/21.17 |
| 5,754,414 | A | * | 5/1998 | Hanington ................. 363/21.12 |
| 5,841,643 | A | * | 11/1998 | Schenkel .................... 363/21.13 |
| 6,061,257 | A | * | 5/2000 | Spampinato et al. ...... 363/21.13 |
| 6,172,885 | B1 | * | 1/2001 | Feldtkeller ................... 363/21.1 |
| 6,501,921 | B2 | * | 12/2002 | Higuchi ......................... 399/88 |
| 7,310,251 | B2 | * | 12/2007 | Yang et al. ................. 363/56.09 |
| 7,558,084 | B2 | * | 7/2009 | Jang ............................ 363/21.12 |
| 7,561,452 | B2 | * | 7/2009 | Mednik et al. ................... 363/97 |
| 7,821,239 | B2 | * | 10/2010 | Hosotani et al. .............. 323/267 |
| 7,978,484 | B2 | * | 7/2011 | Grant et al. ................. 363/21.18 |
| 8,009,445 | B2 | * | 8/2011 | Nakamura ................. 363/21.12 |
| 8,081,495 | B2 | * | 12/2011 | Vecera et al. .............. 363/21.12 |
| 8,149,598 | B2 | * | 4/2012 | Mimura .......................... 363/20 |
| 8,213,192 | B2 | * | 7/2012 | Konecny et al. ........... 363/21.13 |
| 8,451,628 | B2 | | 5/2013 | Strzalkowski |
| 2011/0242858 | A1 | | 10/2011 | Strzalkowski |

* cited by examiner

*Primary Examiner* — Adolf Berhane
(74) *Attorney, Agent, or Firm* — Schwegman Lundberg & Woessner, P.A.

(57) ABSTRACT

A switching converter system includes a feedback path with at least one comparator arranged to provide a digital error signal in response to a comparison of an output voltage to a reference voltage. A first isolation channel can be configured to isolatably transport a clock signal to digitally gate the error signal, and a second isolation channel can be configured to isolatably transport the error signal. A controller can be coupled to the first and second isolation channels and configured to control a duty cycle in response to the error signal. A transformer is preferably inserted into the first and second isolation channels to enhance isolation and the first and second isolation channels respectively can include first and second digital gates that each have an output port coupled to an input port of the other.

20 Claims, 6 Drawing Sheets

SWITCHING CONVERTER SYSTEMS WITH ISOLATING DIGITAL FEEDBACK LOOPS

CROSS-REFERENCE TO RELATED APPLICATIONS

This application is a continuation of and claims the benefit of priority to U.S. patent application Ser. No. 12/752,930, filed on Apr. 1, 2010, which is hereby incorporated by reference herein in its entirety.

BACKGROUND OF THE INVENTION

1. Field of the Invention

The present invention relates generally to switching power converters.

2. Description of the Related Art

Switched-mode voltage converters provide superior power conversion efficiency because they regulate an output voltage or output current with transistor switches that are either on or off so that they never operate in the linear region in which both current and voltage are nonzero. Because at least one of transistor current and voltage is therefore always close to zero, power dissipation is greatly reduced. Because of their high efficiencies, switching converters have been found to be particularly useful in a variety of portable devices (e.g., mobile phones, digital cameras, digital radios, portable disk drives and media players) that are powered by internal batteries (e.g., lithium batteries).

Feedback control in these converters has typically been accomplished with analog circuits that generally have performance-limiting characteristics, e.g., low bandwidth, high power consumption, and parameter degradation over temperature. Accordingly, the performance of conventional feedback controls has been found to be a limiting element in modern switching converter systems.

BRIEF SUMMARY OF THE INVENTION

The present invention is generally directed to efficient switching converter systems. The drawings and the following description provide an enabling disclosure and the appended claims particularly point out and distinctly claim disclosed subject matter and equivalents thereof.

DETAILED DESCRIPTION OF THE INVENTION

FIGS. 1-6 illustrate switching converter system embodiments that are controlled to provide an output voltage $V_{out}$ at an output port with the aid of a digital feedback loop designed to provide significant advantages that include:
a) feedback path voltage isolation;
b) high bandwidth;
c) substantial absence of aging problems;
d) high temperature stability;
e) low power consumption;
f) low stand-by power requirement; and
f) provision of operational information (e.g., output signal, protection status, and power demand).

These advantages facilitate the construction of efficient, accurate power supplies that can communicate with a master processor to thereby provide power signals on demand.

Figure 1:
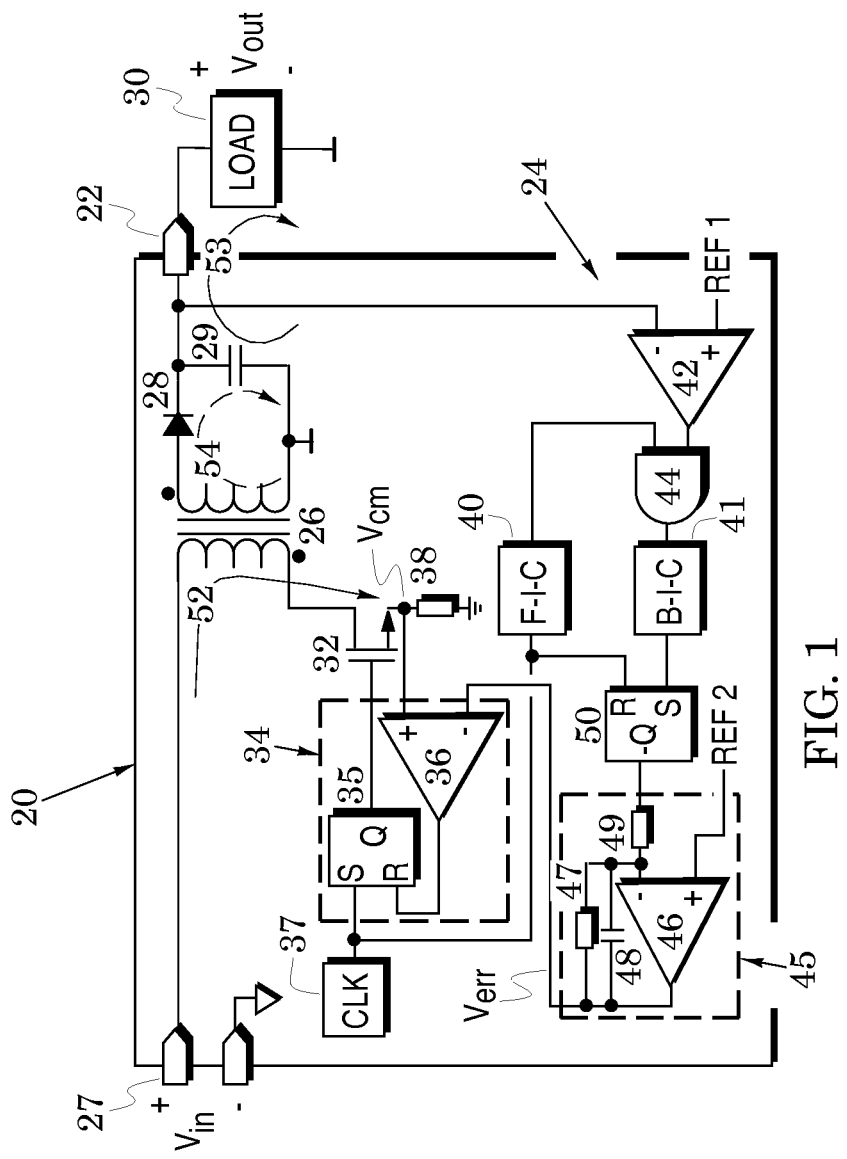
FIG. 1 is a schematic of a switching converter system embodiment.

In particular, the switching converter system 20 of FIG. 1 provides the output voltage $V_{out}$ at an output port 22. A converter forward path includes a transformer 26 having a primary coil coupled to an input port 27 and a secondary coil coupled through a diode 28 to a capacitor 29 that is, in turn, coupled to drive a load 30 that is connected across the output port 22. The diode 28 acts as a switch in the secondary coil of the transformer 26 and a transistor 32 is coupled to act as a switch in the primary coil of the transformer. The primary and secondary coils are arranged so that a positive voltage across the primary coil induces a negative voltage across the secondary as indicated by dots on the transformer 26. The converter forward path of the system 20 is thus formed in a flyback configuration.

Figure 3:
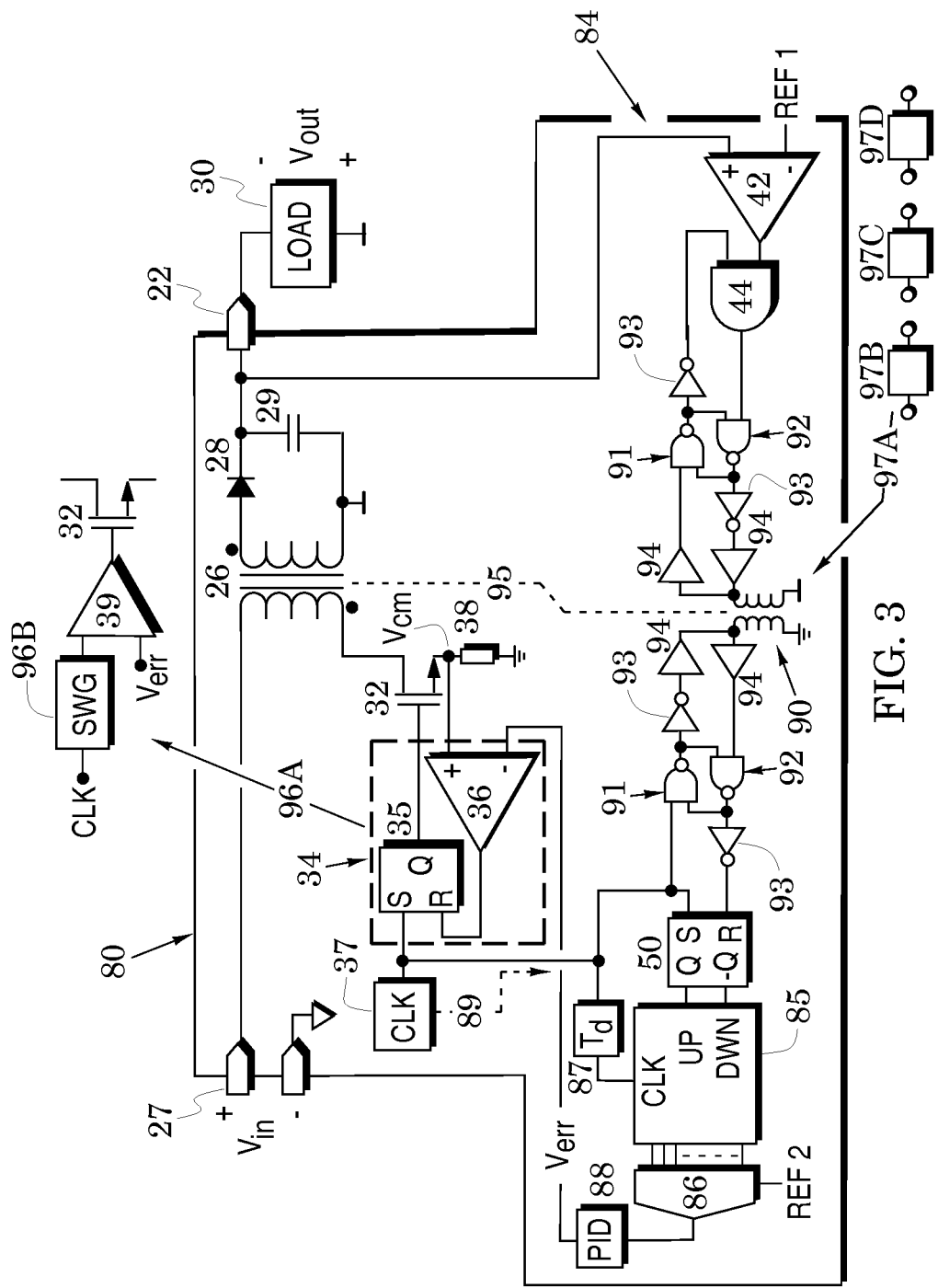
FIG. 3 is a schematic of another switching converter system embodiment.

A current-mode pulse-width modulator (PWM) 34 is formed with a logic element (e.g., a flip-flop 35) and a comparator 36. A clock 37 provides clock signals to the set port of the flip-flop 35 and the comparator 36 drives the reset port in response to the difference between an error voltage $V_{err}$ from the feedback path 24 and a current-mode voltage $V_{cm}$ from a junction between the transistor 32 and a resistor 38. The output of the flip-flop 35 is coupled to the control terminal (e.g., a gate) of the transistor 32 to control its duty cycle in response to the error voltage $V_{err}$ and current through the transistor. It is noted that the status of the current can be provided by various structures. For example, from voltage across the internal resistance of the transistor 32 or from voltage at a junction between the transistor 32 and a resistor 38 as shown in FIG. 3.

The feedback path 24 includes a forward isolation channel (F-I-C) 40 and a backward isolation channel (B-I-C) 41. The F-I-C receives clock signals from the clock 37 and a comparator 42 is arranged to compare the output voltage $V_{out}$ to a first reference voltage REF 1. A gate 44 drives the B-I-C in response to signals from the F-I-C and the comparator 42.

A flip-flop 50 is arranged to receive a set signal from the B-I-C 41 and a reset signal from the clock 37. A compensated error amplifier 45 is formed with a differential amplifier 46, a resistor 47 and a capacitor 48 that are coupled across the differential amplifier, and a resistor 49 that is coupled between the comparator and the flip-flop 50. In response to the difference between a signal from the flip-flop 50 and a second reference voltage REF 2, the error amplifier 45 provides the error voltage $V_{err}$ to one input of the comparator 36 of the PWM 34. The values of the capacitor 48 and resistors 47 and 49 are chosen to adjust gain and phase in the feedback to thereby stably compensate the frequency response of the feedback path 24.

When the transistor 32 is on during each period of the clock 37, a current 52 flows through the primary coil of the transformer 26 to thereby store energy in the transformer. Because of the voltage reversal of the secondary coil, the diode switch 28 is turned off and, during this time, the capacitor 30 is the sole source of current to the load 30 as indicated by the current 53. When the transistor 32 is turned off during the remainder of the clock period, the current 52 rapidly decreases to thereby induce a current 54 in the secondary coil. At least a portion of the current 54 flows into the capacitor 29 to restore at least a portion of the energy lost during the time the transistor 32 was turned on (the current 54 is shown by a dashed arrow to differentiate it from the current 52 and 53 that flow when the transistor 32 is turned on).

If a duty cycle D is defined as the ratio of on-time of the transistor 32 to the period of the clock 37 and if a turns ratio n is defined as the ratio of primary turns to secondary turns in the transformer 26, then the output voltage $V_{out}$ at the output port 22 is $$V_{out} = \frac{1}{n}\frac{D}{1-D}V_{in}. \quad (1)$$

Operation of the feedback path 24 acts to adjust the duty cycle so that the output voltage $V_{out}$ is maintained to be substantially equal to 1/n times the input voltage $V_{in}$. It is noted that the polarity of the output voltage can be reversed by rearranging the secondary coil to reverse the secondary polarity and by reversing the diode 28.

Figure 2:
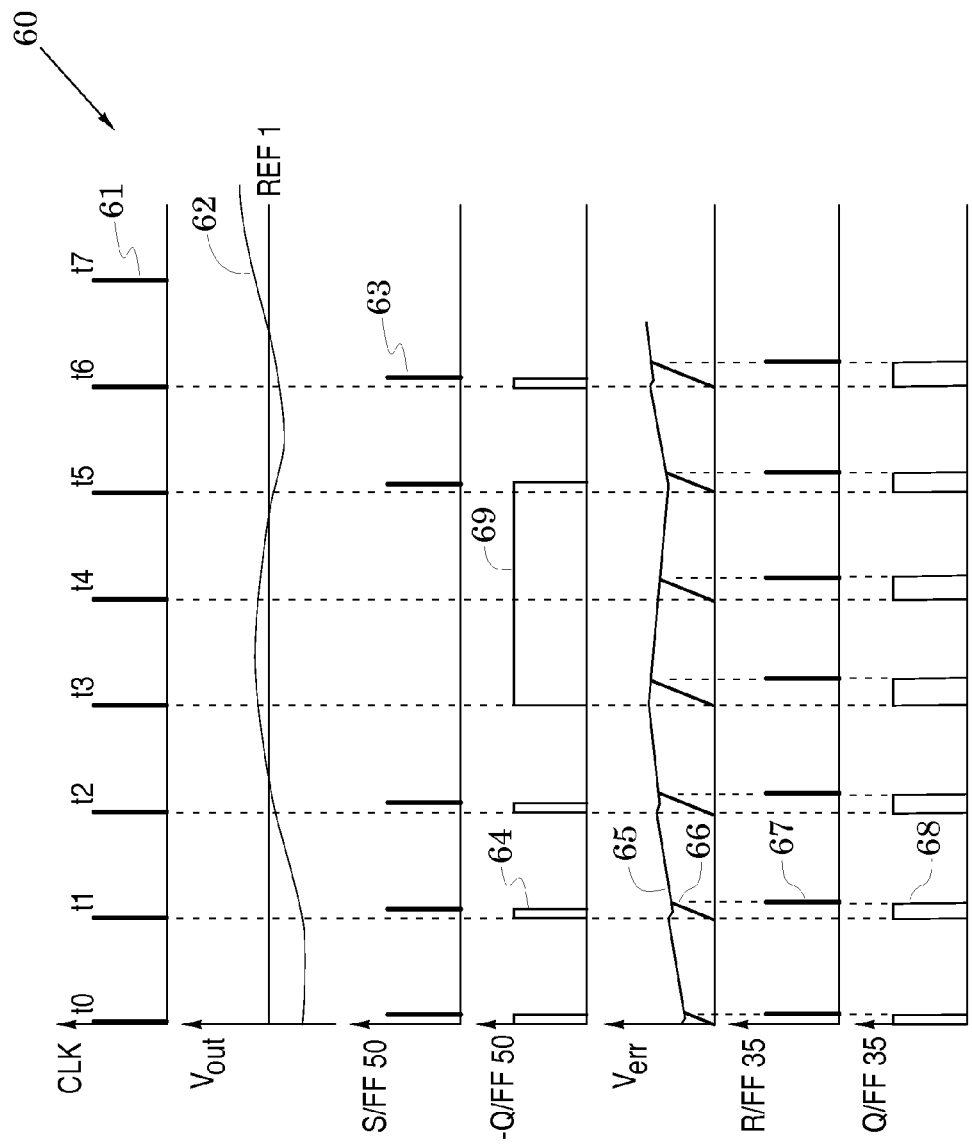
FIG. 2 is a diagram that illustrates signals in the system of FIG. 1.

Operation of feedback through the switching converter system 20 can be explored with the aid of the graph 60 of FIG. 2. The plot 61 of the graph shows exemplary clock signals t1, t2 and so on from the clock 37 of FIG. 1. These signals set the flip-flop 35 so that it turns on the transistor 32 and, at the same time, the flip-flop 50 is reset. For illustrative purposes, it is assumed that the output voltage $V_{out}$ of the system 20 of FIG. 1 begins at a voltage below the first reference voltage REF 1 as shown by the plot 62. Accordingly, the output of the comparator 42 is positive and it gates the clock signals t1 and t2 through the gate 44 and the B-I-C 41 to repeatably set the flip-flop 50. Because of time delays through the F-I-C 40 and the B-I-C 41, the resulting pulses at the flip-flop 50 are slightly delayed from their respective clock signals t1 and t2 as shown in the plot 63.

Therefore, the clock signals t1 and t2 reset the flip-flop 50 and the slightly-delayed pulses from the B-I-C set the flip-flop so that the output of the flip-flop 50 is low except for narrow pulses 64 as shown in the graph 60 of FIG. 2. This output of the flip-flop 50 is processed by the error amplifier 45 of FIG. 1 so that the error voltage $V_{err}$ begins to rise as shown by the plot 65 in FIG. 2.

The error voltage $V_{err}$ is compared with the current-mode voltage $V_{cm}$ in the comparator 36 of FIG. 1. As shown in FIG. 2, the current-mode voltage 66 rises as the primary current (52 in FIG. 1) rises. The output of the comparator 36 flips when the current-mode voltage 66 crosses the error voltage 65. At these times, the output voltage of the comparator 36 pulses as shown by reset pulses 67 in FIG. 2. As the error voltage $V_{err}$ increases, it takes longer for the current-mode voltage $V_{cm}$ to cross the error voltage $V_{err}$ and, accordingly, the on time of the switching transistor 32 increases. This is indicated in FIG. 2 by the pulses 68 at the output of the flip-flop 35. Therefore, the duty cycle D increases and the output voltage $V_{out}$ increases as indicated by equation (1).

Eventually, the output voltage $V_{out}$ rises above the reference voltage REF 1 as shown by the plot 62 in FIG. 2 so that the differential amplifier 42 no longer gates the clock signals through the gate 44. Accordingly, the flip-flop 50 is not set and the output of this flip-flop stays high as shown by waveform 69 in FIG. 2. This input causes the error voltage $V_{err}$ out of the error amplifier 45 to decline as shown in FIG. 2. Because it now takes less time for the current mode voltage $V_{cm}$ to cross the error voltage $V_{err}$, the duty cycle of the transistor 32 decreases and the output voltage decreases. This feedback action holds the output voltage substantially as shown in equation (1). In another system embodiment, the narrow pulses 64, shown in FIG. 2 (the output of the flip-flop 50 of FIG. 1), can be reduced or canceled by introducing an appropriate delay in the signal path leading to the reset port of this flip-flop.

It is apparent from FIG. 1 that the current-mode voltage $V_{cm}$ is obtained by sensing the current through the switching transistor 32. Because the converter system 20 thus senses changes in the input voltage $V_{in}$, and adjusts the current mode voltage $V_{cm}$ accordingly, the converter system 20 rapidly responds to changes in the input voltage $V_{in}$. Essentially, the system adjusts the slope of the current-mode voltage 66 in FIG. 2 which appropriately alters the point at which the error voltage $V_{err}$ crosses the current-mode voltage $V_{cm}$. In the absence of this current-mode structure, the response of the system 20 would be slowed because the feedback path 24 would not make appropriate corrections until the output voltage $V_{out}$ was affected by the changes in the input voltage $V_{in}$. The feedback path 24 is, however, also suitable for use with a voltage-mode controller as described below with reference to FIG. 3.

It is apparent from the above descriptions, that the feedback signal of the converter system 20 of FIG. 1 is converted to a digital signal in the comparator 42 and is converted back to an analog signal by the error amplifier 45. DC voltage isolation between the input and output of the feedback path is provided by isolation designed into the F-I-C 40 and the B-I-C 41. The forward isolation channel 40 transports the clock signal to gate an error signal from the comparator 42 through the gate 44. The backward isolation channel 41 transports the error signal to the flip-flop 50.

FIG. 3 illustrates another switching converter system embodiment 80 that includes elements of the system 20 of FIG. 1 with like elements indicated by like reference numbers. In contrast, however, the feedback loop 24 has been modified to a feedback path 84 by replacing the analog error amplifier 45 with a digital up-down counter 85 that is followed by a digital-to-analog converter (DAC) 86 which also receives a reference voltage REF 2. The counter will count up or down on each clock pulse and the direction of the count is determined by the outputs of the flip-flop 50 which is coupled to the up and down ports of the counter. To insure that the count direction command arrives at the counter 85 before the clock pulse to be counted, a time delay 87 is preferably inserted into the clock path before it reaches the counter. In a system embodiment, a proportional-integral-derivative compensator (PID) 88 may be inserted to process the output of the DAC 86.

In addition, the forward and backward isolation channels 41 and 42 of FIG. 1 are realized in the feedback path 84 with the isolation of a single micro-pulse transformer 90. The isolation channels are further realized in the forward direction with NAND gates 91 and in the backward direction with NAND gates 92. On each side of the transformer, the gates 91 and 92 each receive an input from the output of the other so that signals can only proceed in one direction at any given time.

Therefore, if signals are proceeding forward through gates 91, signals cannot proceed backward through gates 92 and if signals are proceeding backward through gates 92, signals cannot proceed forward through gates 91. This arrangement of gates facilitates the use of the single transformer 90 for isolation in forward and backward signal transmission and thus builds isolated, bidirectional digital feedback paths. An inverter 93 follows each of the gates 91 and 92 to return signals to their original state. In each of the forward and backward directions, digital interface buffers 94 are inserted just before and after the transformer 90 to drive and receive pulses through this transformer. In a system embodiment, the buffers driving the transformer 90 are preferably configured to drive currents sufficient to fully energize it and the buffers driven by the transformer may be configured to detect peak currents from the transformer.

Figure 4:
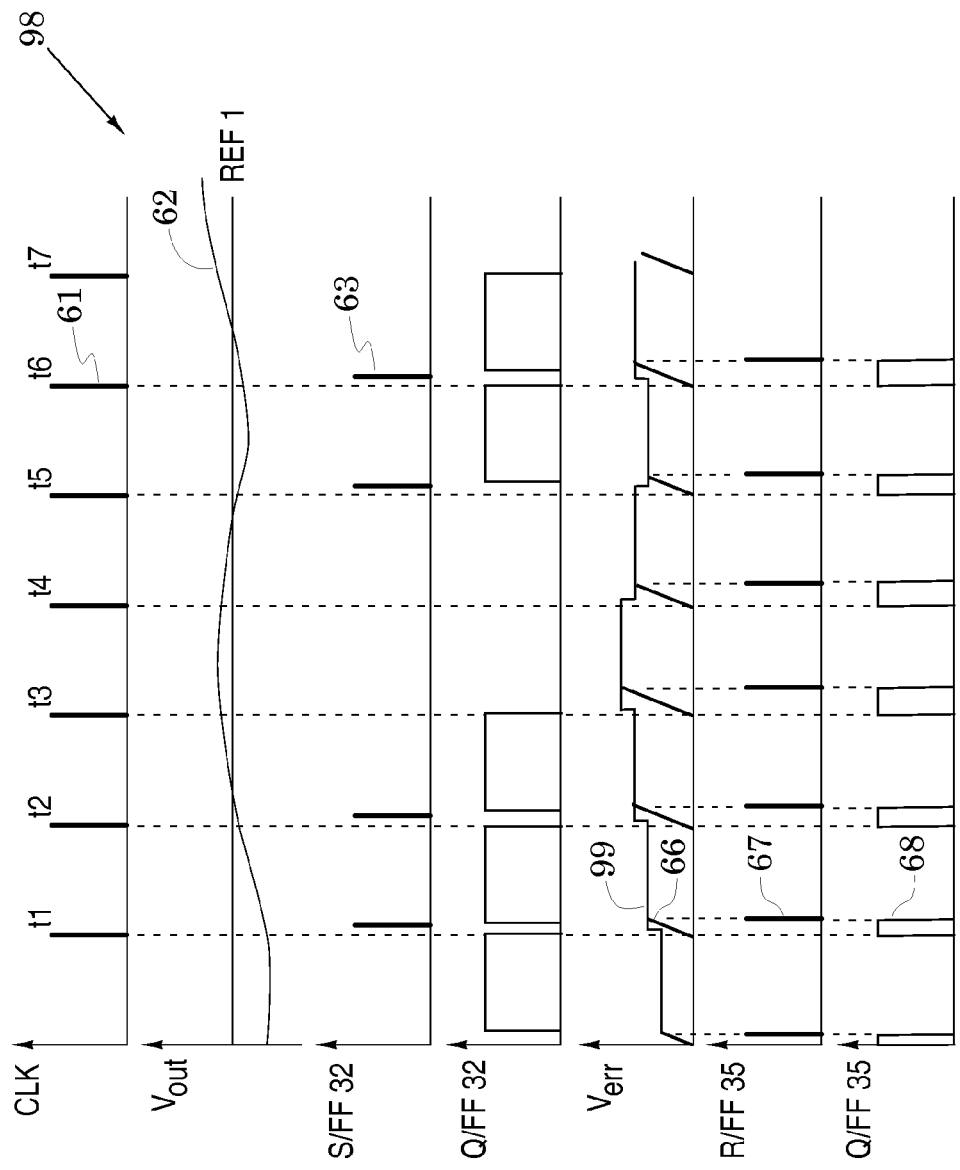
FIG. 4 is a diagram that illustrates signals in the system of FIG. 3.

Operation of feedback through the switching converter system 80 is illustrated in the graph 98 of FIG. 4 which includes plots of the graph 60 of FIG. 2 with like elements indicated by like reference numbers. The graph 98 differs from the graph 60 in that the error voltage 65 of graph 60 is comprised of ramps out of the error amplifier 45 whereas the error voltage 99 of the graph 98 is comprised of steps out of the DAC 86. It is apparent in FIG. 3 that, for each clock pulse from the clock 37, the counter 85 goes up or down by one count depending on the state of the Q port of the flip-flop 50. This digital step is converted to the analog steps shown in the plot 99. The remaining plots of the graph 98 are substantially those of corresponding plots of the graph 60. In the graph 98, however, the plot of the output of the flip-flop 50 is inverted from that of the graph 60 of FIG. 2 because the output shown is that of the Q port rather than that of the –Q port.

The gain of the digital feedback path 84 can be adjusted by varying the second reference voltage REF 2 that is provided to the DAC 86. Increasing this reference voltage, for example, increases the gain of the feedback path 84. In another system embodiment, the path gain can be adjusted in the digital programming of the DAC 86. In a system embodiment that includes the PID 88, the path gain can also be adjusted with this path element.

The bandwidth of the digital feedback path 84 can be adjusted independently of the path gain. In a system embodiment, the clock 37 can be configured to provide the clock 89 of FIG. 3 at a high frequency $f_b$ to the digital elements of the feedback path such as the flip-flop 50, the counter 85 and the DAC 86. A divided-down version of this clock at a lower frequency $f_f$ is then provided to the power elements in the forward path of the system such as the flip-flop 35. Increasing the ratio $f_b/f_f$ will increase the path bandwidth and decreasing the ratio $f_b/f_f$ will decrease the path bandwidth. It is apparent that this adjustment can be made independently from the path gain adjustment described above.

The advantageous DC voltage isolation between converter input and output portions is especially evident in the converter system 80 of FIG. 3. The broken line 95 indicates an isolation barrier between input coils of the transformers 26 and 90 and output coils of these transformers. This galvanic isolation is further emphasized by the use in FIG. 3 of one type of ground symbol at an end of the resistor 38 and at an input side of the transformer 90 and another type of ground symbol at an output side of the transformer and at the output load 30. This isolation between input and output is especially useful in electronic systems (e.g., AC/DC adaptors and laptop computer power supplies) that must provide isolation from a power grid.

In response to current through the transistor 32 of FIG. 3, the resistor 38 provides the current-mode voltage $V_{cm}$ for comparison with the error voltage $V_{err}$. As indicated by a modification arrow 96A, the resistor can be discarded and the PWM 34 can be modified with a sawtooth waveform generator (SWG) 96B that is arranged to drive one port of a comparator 39 in response to the clock 37. Comparison of the error voltage $V_{err}$ with the sawtooth waveform of the SWG forms the same pulses 68 that are shown in the graph 98 of FIG. 4. Thus, the current-mode control can be replaced by voltage-mode control. The latter control is generally more power efficient as it removes the power dissipation associated with the resistor 38.

DC voltage isolation in the feedback path 84 of FIG. 3 was obtained with the transformer 90. As shown by substitution arrow 97A in FIG. 3, other isolating devices (e.g., an opto-coupler 97B, a giant magneto-resistive resistor 97C or a capacitor-based isolator 99D) may be substituted to obtain other useful converter system embodiments.

Figure 5:
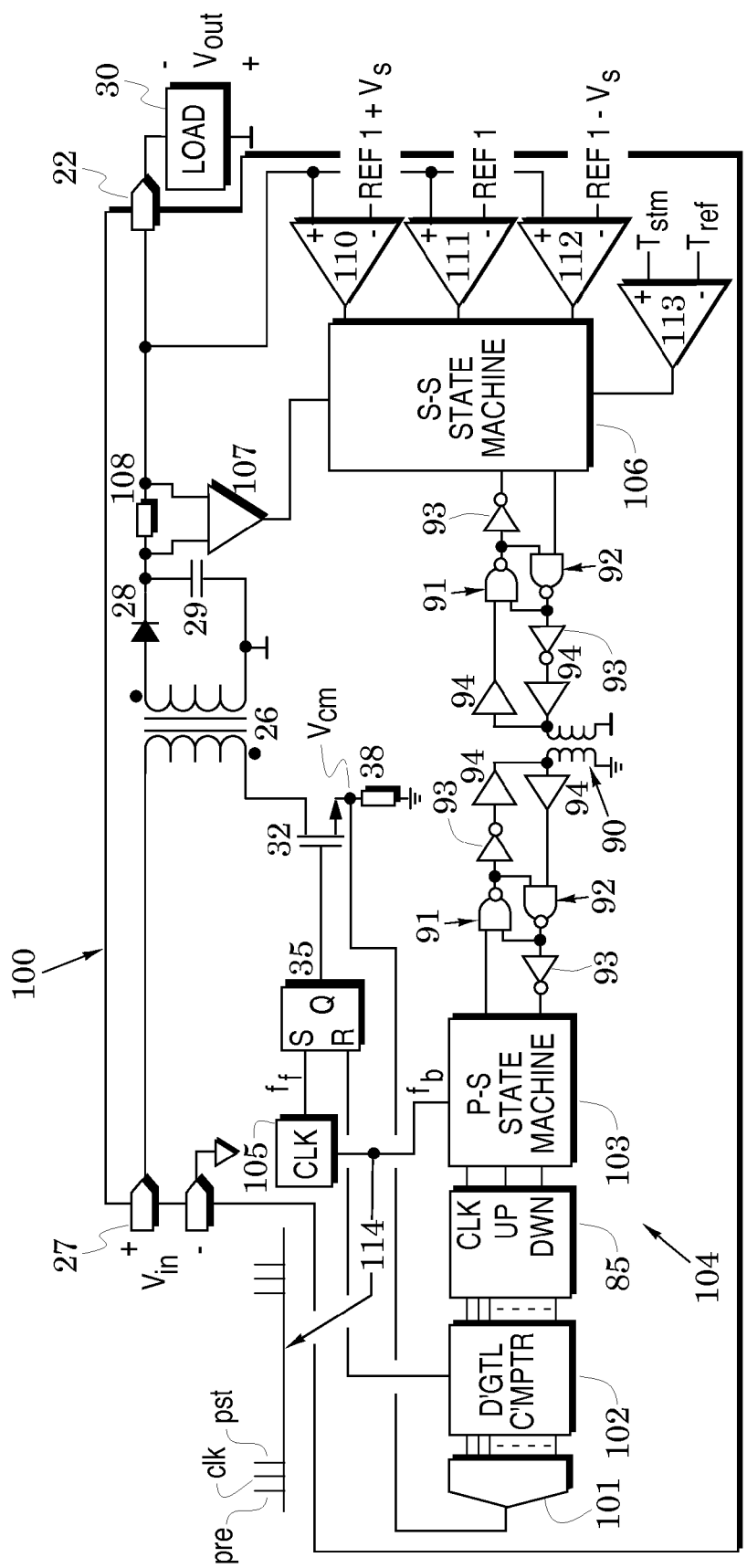
FIGS. 5 and 6 are schematics of other switching converter system embodiments.

FIG. 5 illustrates another switching converter system embodiment 100 that includes elements of the system 80 of FIG. 3 with like elements indicated by like reference numbers. In the system 100, the feedback path 84 has been modified to a bidirectional feedback path 104 by replacing the analog comparator 36 with a digital comparator 102 that is driven by the counter 85. In addition, the DAC 86 is replaced by an analog-to-digital converter (ADC) 101 that provides a digital version of the current-mode voltage $V_{cm}$ to the digital comparator 102. In addition, a primary-side (P-S) state machine 103 replaces the flip-flop 50 and its associated delay 87.

The clock 37 of the system 80 of FIG. 3 is replaced with a clock 105 that is configured to provide a first clock at a high frequency $f_b$ to the P-S state machine 103 in the feedback path and a second clock at a divided-down frequency $f_f$ to the flip-flop 35 in the forward path. The second clock can be provided, for example, with a programmable divider. As indicated by an arrow 114 pointing away from the first clock path, the second clock may comprise a pre-clock pulse (marked pre) before each clock pulse (marked clk) and a post-clock pulse (marked pst) after each clock pulse.

In addition, the comparator 42 and gate 44 of the system 80 is replaced by a secondary-side (S-S) state machine 106 which can receive information about current through the load 30 at the output port 22 from a buffer 107 coupled to a resistor 108 inserted between the output port and the diode 28 and capacitor 29. The S-S state machine 106 receives input signals from comparators 110, 111 and 112. Comparator 111 is arranged to compare the output voltage $V_{out}$ to the first reference voltage REF 1 that was introduced in FIGS. 1 and 3 (and also shown in FIGS. 2 and 4). Comparator 112 is arranged to compare the output voltage $V_{out}$ to the first reference voltage REF 1 less a selected voltage $V_s$ and the comparator 110 is arranged to compare the output voltage $V_{out}$ to the first reference voltage REF 1 plus the selected voltage $V_s$. The state machine 106 also receives input signals from comparator 113 which compares measured temperature $T_{stm}$ of the system to a reference temperature $T_{ref}$. It is noted that digital state machines are well-known digital devices configured to transition between a number of states that each map a respective set of input signals to a respective set of output ports.

Because the state machines 103 and 106 can each be configured to store status of system conditions, alter that status in response to input signals, and initiate actions and outputs in response to the altered status, they are especially suited to facilitate operation of the system 100. In an exemplary operation, the P-S state machine 103 sends interrogation signals through gates 91 to the S-S state machine 106 and receives signals in return via the gates 92. The arrangement of the three clock pulses pre, clk and pst (see arrow 114) allows the S-S state machine 106 to transmit extended information about the output voltage $V_{out}$ at the output port 30. If that voltage is just above or just below the reference voltage REF 1 (as determined by the comparator 111), the S-S state machine is configured to send signals that alter the error signal out of the P-S state machine (delivered to the counter 85) by a predetermined amount similar to those shown in the stepped error voltage 99 of FIG. 4. For example, the S-S state machine might send codes 110 and 100 to the P-S state machine to signify these conditions.

If the output voltage $V_{out}$ at the output port 30 is further than the selected voltage $V_s$ from the reference voltage REF 1 (as determined by comparators 110 and 112), the S-S state machine is configured to send signals that step the error signal out of the P-S state machine 103 by greater amounts. For example, the S-S state machine might send codes 101 and 111 to the P-S state machine 103 to signify these conditions. Accordingly, the times for the intersection of the current-mode signal 66 and the error signal 99 in FIG. 4 are increased so that the turn off of the transistor 30 of FIG. 3 is hastened or delayed more than when the output voltage $V_{out}$ is closer to the reference voltage REF 1. The result is that the feedback path 104 responds faster when the output voltage $V_{out}$ is further from the reference voltage REF 1.

Via the comparator 107, the S-S state machine 106 can also sense an over-current condition in the system 100. In response, it can send a code (e.g., 001) to the P-S state machine 102 to significantly decrease the error signal to the counter 85. This will cause turn off of the transistor 30 to be greatly hastened to thereby substantially reduce currents to the output load 30. Via the comparator 107, the S-S state machine 106 can also sense light-load conditions in the system 100. In response, it can then send a code (e.g., 011) to the P-S state machine 103 to significantly decrease the error signal to the counter 85. This will also cause turn off of the transistor 30 to be greatly hastened to thereby reduce currents to the output load 30.

Communicating through gates 91 and 92 of the bidirectional feedback path 104, the state machines 103 and 106 of FIG. 5 can be configured to enhance the operation of the converter forward path. In a telecommunications system, for example, it may be desired to increase voltage to an RF power amplifier prior to an increase of the system's bandwidth. Accordingly, the S-S state machine 106 can receive (via an appropriate interface) a command to increase the output voltage $V_{out}$. In response, this state machine can program and regulate (with the state machine 103) operation of the forward path to realize the increased output voltage. In a cell-phone battery charger, for a second example, the S-S state machine 106 can be configured to measure the battery voltage to determine a discharge level and then control (with the state machine 103) an appropriate charging current.

It is apparent that the bidirectional feedback path 104 is formed by first and second isolation channels that respectively include the gates 91 and 92. It is further apparent that the first and second state machines 103 and 106 are arranged to operate together and communicate system status through the first and second isolation channels.

Figure 6:
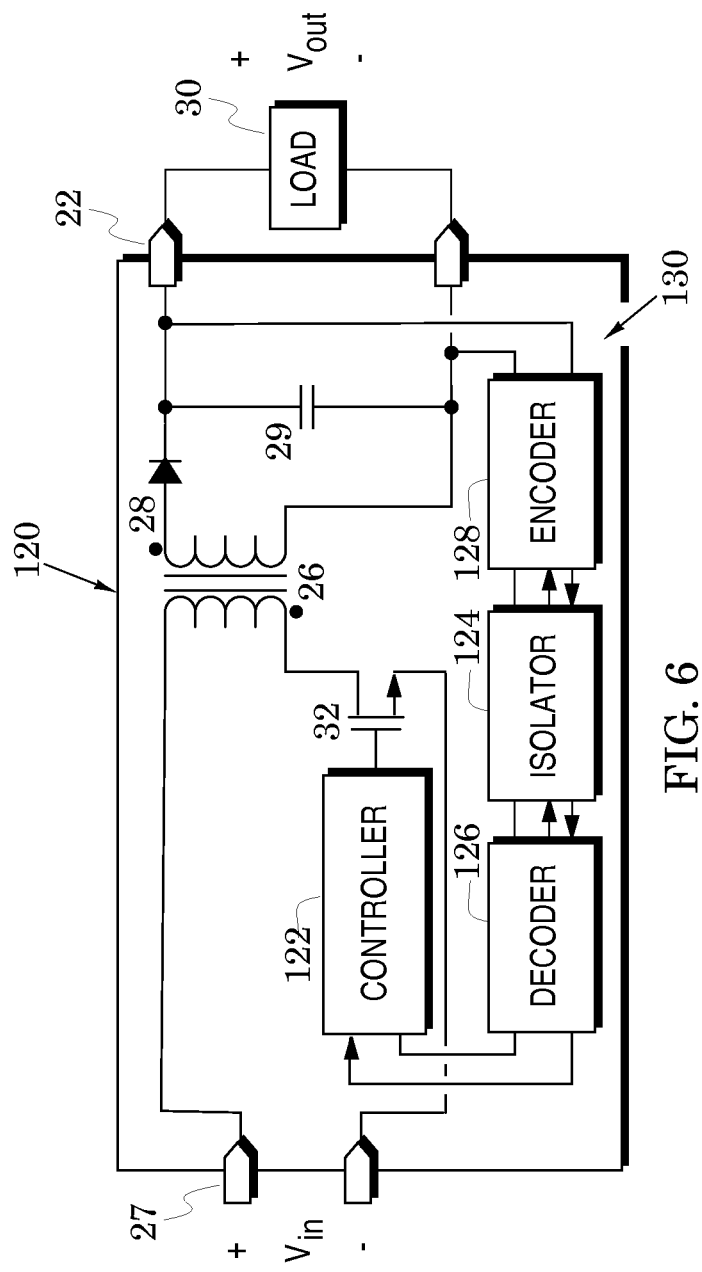

FIG. 6 illustrates another switching converter system embodiment 120 in which the input port 27, output port 22, transformer 26, transistor 30, diode 28 and capacitor 29 are arranged as in the systems 20, 80, and 100 of FIGS. 1, 3 and 5. However, the control of the clock 37, clock 105, flip-flop 35 and comparator 36 of those embodiments is represented by a generic controller 122 in the system 120. In addition, the two-way isolation of the F-I-C 40, B-I-C 41, transformer 90, gates 91 and 92, inverters 93 and buffers 94 of those embodiments is represented by a generic isolator 124. Additionally, the decoding of the error amplifier 45, flip-flop 50, counter 85, DAC 86, PID 88, ADC 101, digital comparator 102, and P-S state machine 103 of those embodiments is represented by a generic decoder 126. Finally, the encoding of the comparator 42, gate 44, S-S state machine 106 and comparators 107, 110, 111, 112 and 113 is represented by a generic encoder 128. The isolator 124, decoder 126 and encoder 128 form a bidirectional digital feedback path 130. The isolating use of a micropulse transformer in the isolator facilitates the reduction of chips and chip sizes and provides a wide bandwidth (e.g., several gigahertz).

In system operation, the encoder digitally forms information on outputs such as the state of the output voltage $V_{out}$. The decoder 126 and encoder 128 can rapidly exchange signals through the isolator 124. For example, information about output characteristics such as the output voltage $V_{out}$, protection status, and load power demand is encoded in the encoder 128 and transmitted via the isolator 124 to the decoder 126. Bidirectional information exchange can be governed by a set of rules, i.e., a protocol, that is programmed into the system. This protocol enables rapid information exchange through the isolator with low energy consumption.

The decoder 146 can determine timing points for interrogation requests of the encoder 128, via the isolator 124, to obtain information such as error signals and operational states. The decoder 126 and controller 122 are configured to then take appropriate operational steps such as altering the pulse width of the transistor (32 in FIGS. 1, 3 and 5), altering path bandwidth and gain, and initiating protective actions in response to conditions such as over-current, over-temperature and light-load.

The digital feedback paths of the system embodiments are especially suited to provide wide bandwidth, high DC voltage isolation, excellent temperature stability, low power consumption, be efficient in stand-by or light-load operational modes, provide operational information and substantially reduce aging problems that are found in conventional switching systems. As noted above, isolation between converter input and output portions is an important advantage of converter systems using isolation structures exemplified in the system embodiments of FIGS. 1, 3, and 6. This isolation can be useful in electronic systems, e.g., battery-management systems, that must provide isolation from a power grid.

Switching converter system embodiments have been illustrated with the transistor 32, transformer 26, diode 28 and capacitor 29 of the converter forward path arranged in the flyback configuration (e.g., see FIG. 1) which is an isolated version of the well-known buck-boost converter. Other converter system embodiments may be formed with other converter arrangements that provide voltage isolation between input and output ports of a system. For example, the flyback configuration can be replaced with a forward configuration which is an isolated version of the well-known buck converter.

The embodiments of the invention described herein are exemplary and numerous modifications, variations and rearrangements can be readily envisioned to achieve substantially equivalent results, all of which are intended to be embraced within the spirit and scope of the appended claims.

I claim:

1. A switched converter system, comprising:
    a converter forward path, including a first switch, an inductive element, a second switch, and a capacitor, wherein an input voltage is coupled to the inductive element using the first switch, and an output voltage is provided using the capacitor;
    a feedback path, including an encoder and an isolator, the encoder configured to receive the output voltage and provide a digital signal to the isolator that is indicative of a relationship between the output voltage and a reference voltage; and
    a controller circuit, configured to update a switching period and/or duty ratio of the first switch using information about the relationship between the output voltage and the reference voltage that is received from the isolator.

2. The switched converter system of claim 1, wherein the encoder in the feedback path is synchronized with the first switch using a common clock signal.

3. The switched converter system of claim 1, arranged in a forward converter configuration, wherein the converter forward path includes a transformer having a primary side coupled to the first switch and a secondary side coupled to the inductive element, the second switch, and the capacitor.

4. The switched converter system of claim 1, wherein the controller circuit includes a first comparator having an output, a first input, and a second input, wherein the first input is coupled to the isolator and configured to receive the information about the relationship between the output voltage and the reference voltage, the second input is coupled to a voltage waveform generator, and the output is configured to provide a control signal to the first switch to update the duty ratio of the first switch.

5. The switched converter system of claim 4, comprising a voltage waveform generator, wherein the second input of the first comparator is coupled to an output of the voltage waveform generator, wherein the voltage waveform generator is configured to generate one of a sawtooth or staircase voltage waveform.

6. The switched converter system of claim 5, wherein an output signal from the voltage waveform generator is triggered by a clock signal.

7. The switched converter system of claim 1, wherein the encoder in the feedback path includes a comparator configured to receive the output voltage and, in response, provide a digital error signal indicative of a comparison of the output voltage and the reference voltage.

8. The switched converter system of claim 7, wherein the feedback path comprises a gate, wherein the gate is configured to control, based on a clock signal, transmission from the comparator to the isolator of the digital error signal indicative of the comparison of the output voltage and the reference voltage.

9. The switched converter system of claim 1, wherein the isolator in the feedback path includes a transformer configured to electrically isolate the output voltage from the controller circuit.

10. The switched converter system of claim 1, wherein the isolator in the feedback path includes a forward isolation channel and a backward isolation channel, wherein the backward isolation channel is configured to provide the information about the relationship between the output voltage and the reference voltage to the controller circuit based on a gating signal from the forward isolation channel.

11. The switched converter system of claim 1, wherein the isolator includes at least one of an optocoupler, a giant magneto-resistive resistor, and a capacitor-based isolator.

12. The switched converter system of claim 1, comprising a resistor coupled to the capacitor to provide a load current signal, and a state machine coupled to the resistor, wherein the controller circuit is configured to update the switching period and/or duty ratio of the first switch using information from the state machine about the load current signal.

13. The switched converter system of claim 1, wherein the controller circuit is configured to operate in a voltage-mode to update the switching period and/or duty ratio of the first switch in response to a change in the information about the relationship between the output voltage and the reference voltage.

14. The switched converter system of claim 1, wherein the controller circuit is configured to operate in a current-mode to update the switching period and/or duty ratio of the first switch in response to a current flow change through the first switch.

15. The switched converter system of claim 14, wherein the controller circuit is configured to detect the current flow change as a voltage change at a node between the first switch and a resistive load coupled in series with the first switch.

16. A system, comprising:
a power converter forward path, arranged in a forward configuration, including at least one transistor, a transformer, a diode, an energy storage element, and a capacitor, coupled to the energy storage element, wherein an input voltage is coupled to a primary side of the transformer using the at least one transistor, and an output voltage is provided using the capacitor;
a feedback path, including an encoder and first and second isolators, the encoder configured to receive the output voltage and provide a digitally encoded signal to the first isolator that is indicative of a relationship between the output voltage and a reference voltage; and
a controller circuit, configured to update a switching period and/or duty ratio of the at least one transistor using information about the relationship between the output voltage and the reference voltage that is received from the first isolator, wherein the controller circuit is configured to provide a control signal to the encoder using the second isolator.

17. The system of claim 16, wherein the feedback path includes a decoder configured to receive a digital signal from the isolator that is indicative of the relationship between the output voltage and the reference voltage and, in response, the decoder provides an analog signal to the controller circuit, wherein the controller circuit is configured to update the duty ratio of the at least one transistor using the analog signal.

18. The system of claim 16, comprising a clock generator configured to provide a clock signal, wherein the encoder is triggered by the clock signal to provide the signal indicative of the relationship between the output voltage and the reference voltage, and wherein the at least one transistor is switched according to the same clock signal.

19. The system of claim 18, wherein the digital signal provided by the encoder includes information about at least one of a demand of a load coupled to the capacitor, a detected over-current of the system, a detected over-temperature of the system, or a detected light-load of the system.

20. A converter system, comprising:
a converter path that includes at least one transistor, a transformer, at least one rectifier, and multiple energy storage elements, wherein an input voltage is coupled to a primary side of the transformer using the at least one transistor, and an output voltage is provided from a secondary side of the transformer using the multiple energy storage elements;
a controller circuit, configured to update a switching period and/or duty ratio of the at least one transistor using a digital error signal; and
an isolated feedback path extending from the secondary side of the transformer to the controller circuit, the isolated feedback path synchronized with the controller circuit using a clock signal, the isolated feedback path including:
a comparator configured to provide the digital error signal based on a comparison of the output voltage and a reference voltage;
a first isolation channel configured to transport the clock signal to gate transmission of the digital error signal from the comparator to the controller circuit; and a second isolation channel configured to transport the digital error signal from the comparator to the controller circuit.

\* \* \* \* \*